Oct. 19, 1948.   L. G. HILKEMEIER ET AL   2,451,555
MEANS FOR CHARGING, SEALING, AND DISCHARGING MIXERS
Filed Oct. 23, 1944   5 Sheets-Sheet 5
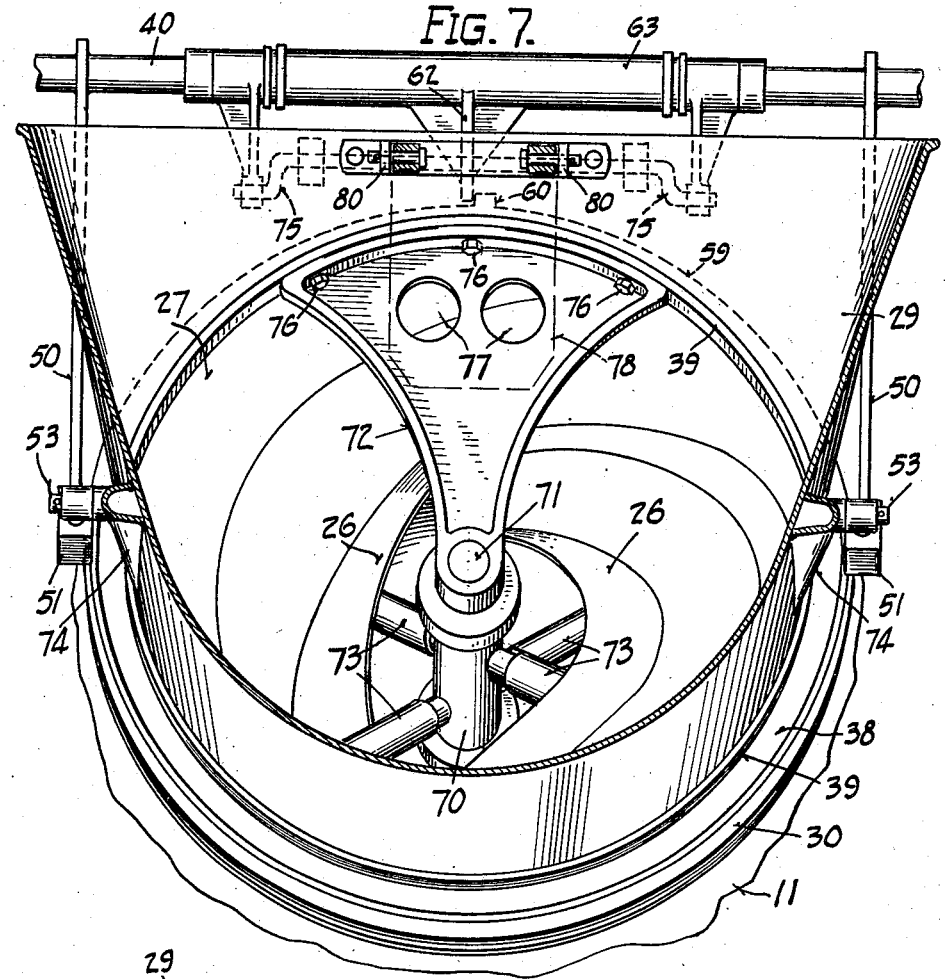
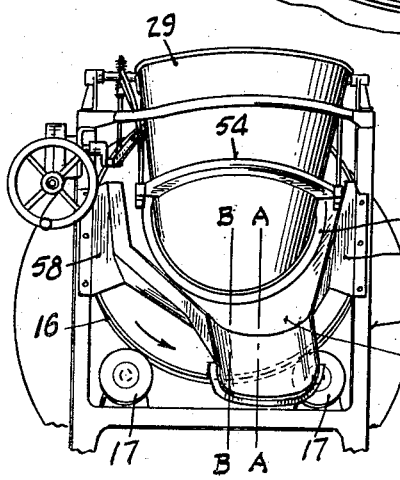
L. G. HILKEMEIER AND G. K. VIALL
BY George A. Evans
atty.

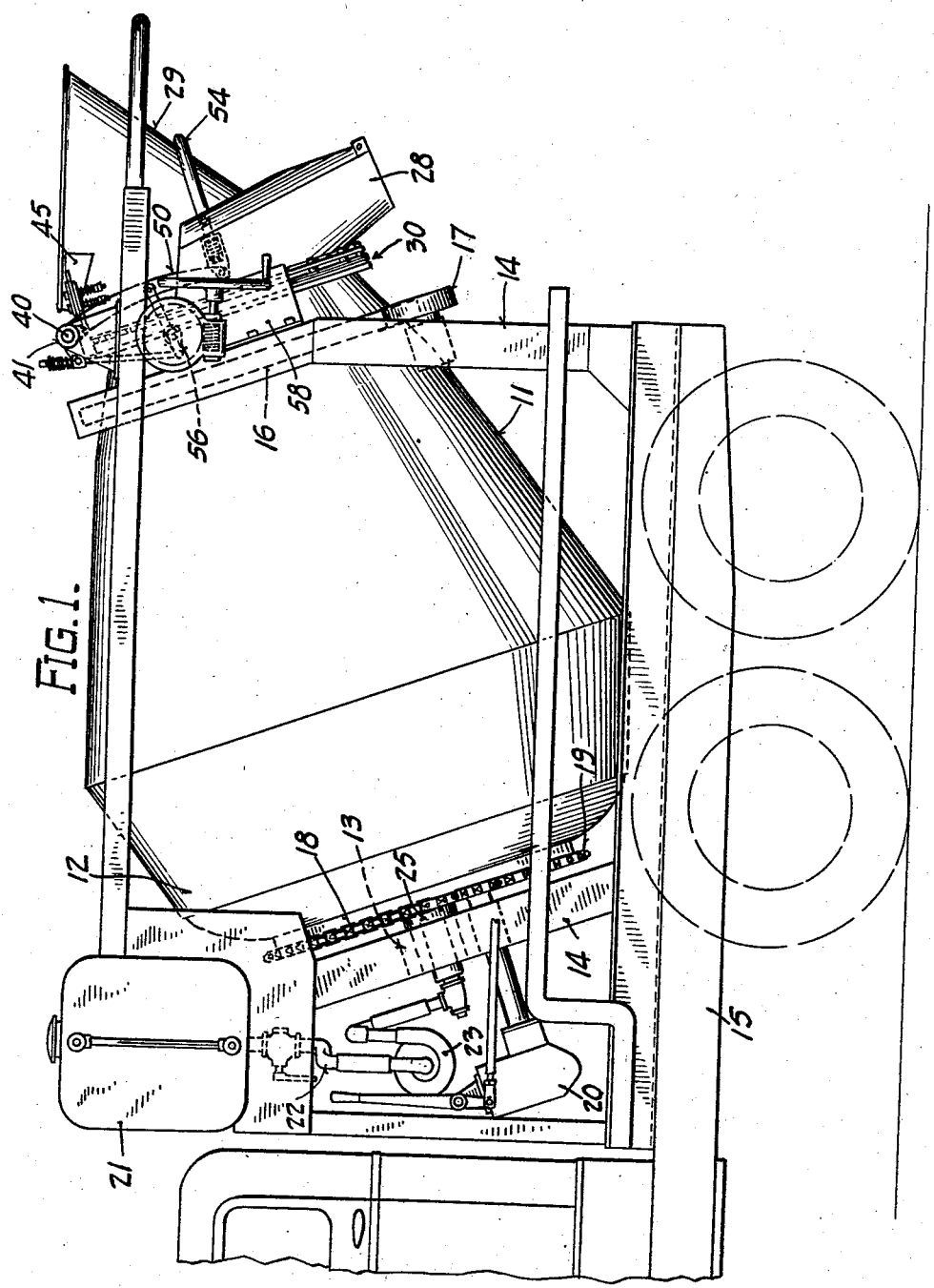

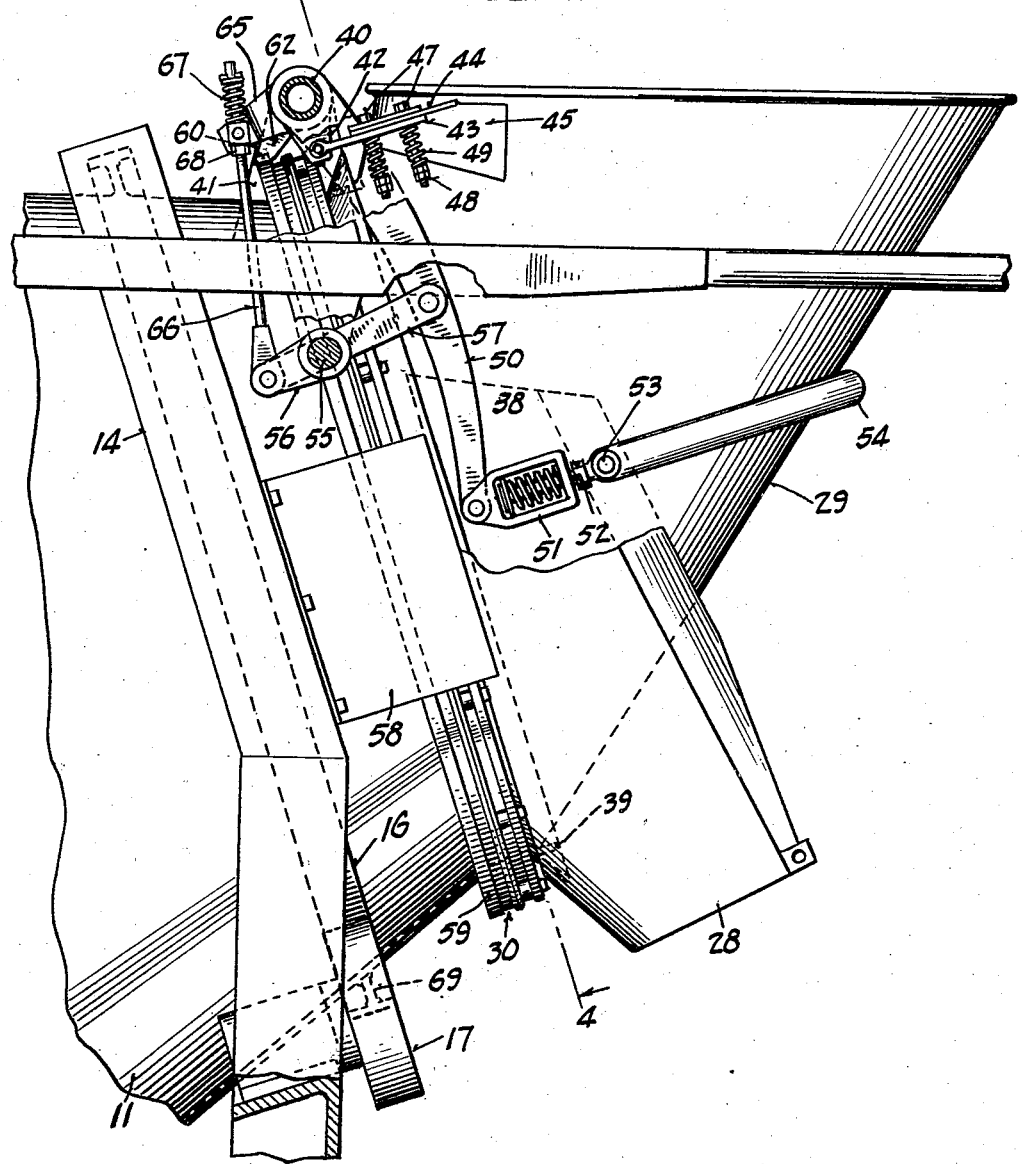

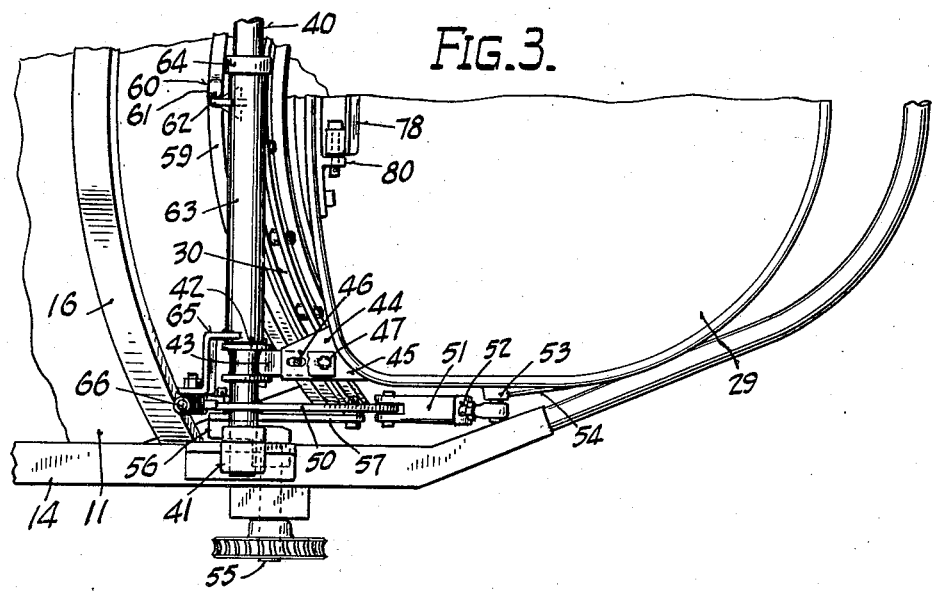
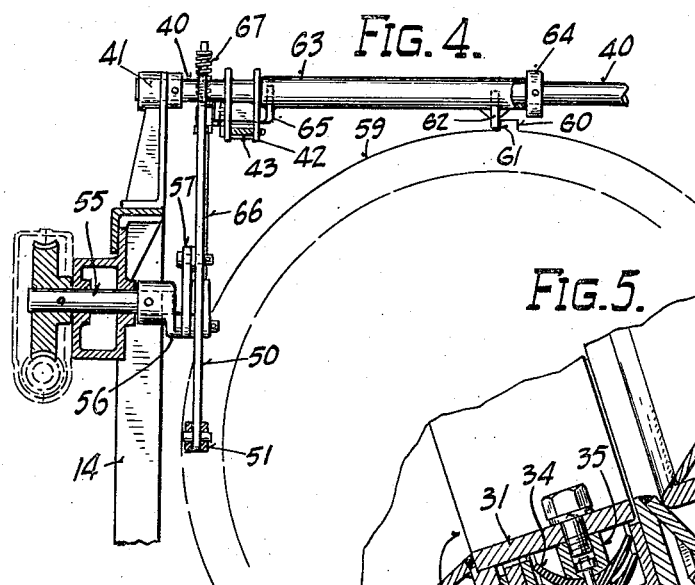
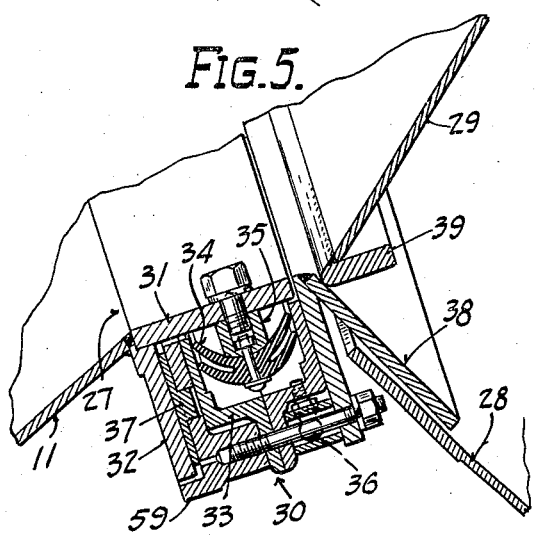

Patented Oct. 19, 1948

2,451,555

UNITED STATES PATENT OFFICE 2,451,555

MEANS FOR CHARGING, SEALING, AND DISCHARGING MIXERS

Louis G. Hilkemeier, West Allis, and George K. Viall, Milwaukee, Wis., assignors to Chain Belt Company, Milwaukee, Wis., a corporation of Wisconsin Application October 23, 1944, Serial No. 559,964

10 Claims. (Cl. 259—161)

This invention relates to instrumentalities for making more effective the charging, mixing and discharging of concrete mixer drums and particularly truck mounted mixers of the type which have an inclined axis with an axial opening at the higher end for such charging and discharging purposes. The present application, setting forth said invention is a continuation-in-part of our prior application, Serial No. 540,466, filed June 15, 1944.

In copending application of one of the present inventors, Louis G. Hilkemeier, Serial Number 439,461 filed April 18, 1942, now Patent No. 2,360,345 entitled Charging means for transit mixers, there is disclosed for use in conjunction with a mixing drum, a rectilinearly movable but non-rotatable charging hopper which is adapted, when the hopper is in charging position, to engage an annular element or collar journalled on the end of the drum. This collar, which is prevented from turning with the drum by locking means mounted on the mixer frame, serves as a bearing member through which thrust is transmitted by the hopper against the end of the drum. This arrangement has considerable advantage over arrangements in which an intermediate bearing member disposed between the hopper and the drum is free to rotate with respect to either the hopper or the drum, for while such bearings are intended to rotate with respect to one member only, they frequently rotate with respect to the other member with the result that wear occurs on surfaces which are not designed to withstand it.

One drawback of the arrangement shown in the aforesaid Hilkemeier application arises from the fact that as concrete is discharged over the collar, the hopper being removed from the drum opening at this time, such concrete as sticks to the collar ring is not removed therefrom and prevents the hopper from being properly seated on the ring when it is moved into charging position and held there during the mixing operation. This may well result in leakage of the concrete between these relatively stationary surfaces during the mixing operation.

It is an object of the present invention to provide a construction, including a hopper for charging such a drum, in which bearing wear may be restricted to properly designed bearing surfaces and also concrete which builds up on the contacting surfaces of the drum and hopper may be effectively cleaned through wiping action.

Another object of the invention is to provide improved receiving means for the concrete as it leaves the drum so as to prevent choking of the flow of concrete, thereby eliminating one of the causes of such concrete accumulations as occur around the drum opening.

Still another object of the invention is to provide improved sealing and bearing means as well as hopper actuating and supporting means which are simpler to construct and give better service than those heretofore used.

The means for accomplishing these and other objects will be more particularly described hereafter and are illustrated in the accompanying drawings, wherein:

Figure 1 is a side elevation of a transit concrete mixer suitable for embodiment of the present invention;

Figure 2 is an enlarged side elevation of the rear portion of the mixer shown in Figure 1 with parts broken away to illustrate the functioning of the charging apparatus;

Figure 3 is a partial plan view of the charging hopper and its actuating linkage;

Figure 4 is a section taken on the line 4—4 of Figure 2;

Figure 5 is an enlarged vertical section taken on the drum axis through the lower part of the drum and sealing ring;

Figure 7 is a section taken on the line 7—7 of Figure 6; and

Figure 8 is a perspective view of the end of the mixer showing the disposition of the receiving chute.

Figure 6:
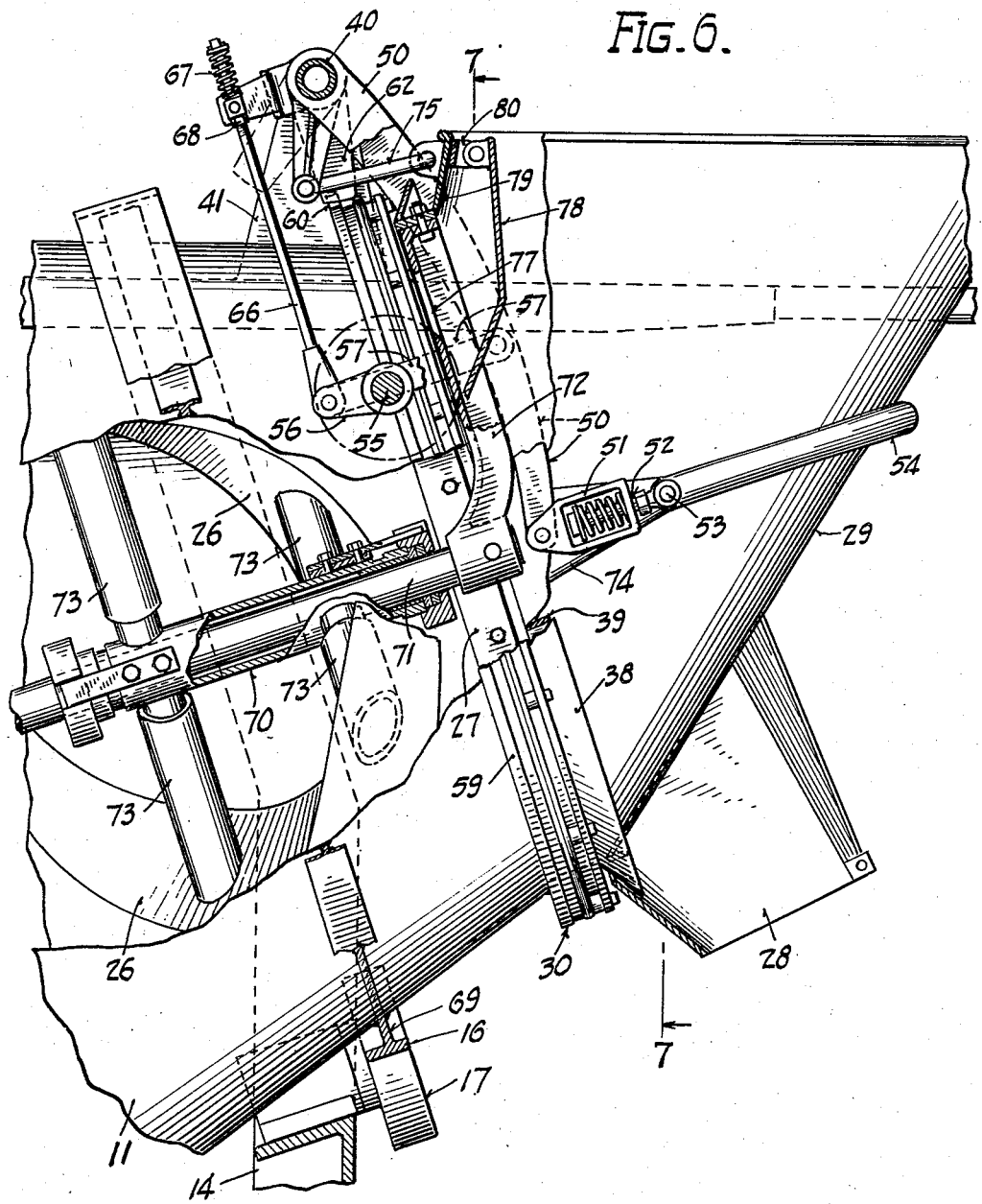
Figure 6 is a side elevation, partly in section, of a modified form of the invention.

In the drawings, numeral 11 designates the mixing drum which is shown mounted for rotation about an axis inclined to the horizontal, the forward end 12 of the drum, which is closed, being supported in an axially disposed bearing 13 mounted on the mixer frame 14. It will be understood that this frame is of the size and configuration permitting it to be mounted on the rear of a truck 15 as illustrated in Figure 1 so that the mixer may be operated while concrete is being hauled from the loading plant to the site of the construction work. The rear end of the drum is provided with an annular track 16 resting on a pair of rollers 17, also mounted on the frame 14. Rotation of the drum is effected by any suitable transmission, preferably a chain drive 18 engaging a sprocket 19 mounted on the forward end of the drum, said transmission being driven through suitable gear reduction means 20 connected either to a separate engine mounted on the mixer frame or a drive connected to the source of power for the truck.

The mixer is equipped with a water tank 21 communicating, through pipes 22 and a pressure pump 23, with the interior of the drum, the conduit 24 leading into the drum extending through the axle 25 which supports the front end of the drum in the manner previously described.

The drum itself is provided with spirally arranged mixing blades 26 extending from the closed forward end to an axially disposed opening 27 at the opposite end. These blades are adapted to propel the concrete making materials rotatively and longitudinally of the drum depending upon the direction of the drum's rotation. The blades terminate adjacent the aforementioned opening and during rotation of the drum in the discharge direction, the mixed concrete is fed through the opening and into a receiving chute 28 for subsequent placement in concrete forms. The opening also serves to admit concrete into the drum, and to direct the flow of raw materials through the opening and to confine the materials in the drum during mixing, a charging hopper 29 is mounted around the opening in a sealed tight manner hereinafter described.

A combined bearing and sealing ring generally designated 30, is journalled on the end of the drum in position where it may be contacted by the annular lower portion of the hopper. The drum opening is surrounded by a short cylindrical extension 31 (as illustrated in Figure 5), and a radially disposed flange 32 extends outwardly from the junction of the member 31 and the drum to provide an outwardly and rearwardly facing space for the bearing ring 30. Certain features of the seal are made the subject matter of a copending application of Louis G. Hilkemeier, Serial Number 515,834, filed December 27, 1943, now Patent 2,439,250 issued April 6, 1948, and will be referred to only briefly herein.

In general, the sealing and bearing member comprises an annular channel shaped element 33 facing inwardly which retains a pair of relatively wide, flat sealing bands 34 mounted concentrically on and in spaced relation to the cylindrical extension 31. When the bands 34 are pressed into channel 33, they assume, through flexure, an arcuate shape with their edges pressed tightly against the side of the channel and since the medial inner portions of the bands are sealed from rim 31 and spaced apart from each other by annular supporting member 35, an effective double acting seal is provided. The space in the bottom of the channel groove is packed with grease to inhibit passage of concrete through the seals and also to lubricate the bearing surface hereinafter described. Grease may be replenished in the seam by means of a suitable grease fitting 36 which is accessible from outside the drum. Disposed between the radial drum flange 32 and the inner flange of the seal-retaining channel 33, and bolted or otherwise secured to the channel is a thrust bearing designated 37 which takes the wear occasioned by the thrust of the charging hopper against the drum. Sealing rings 34 are not intended to transmit thrust but they are sufficiently sturdy to keep the channel ring 33 from being displaced rearwardly when the hopper is moved into discharge position and they also protect the bearing surfaces from the abrasive effects of concrete. Moreover since the seal is outside the drum it affords no obstruction to concrete passing through the drum opening.

The combined bearing and seal retaining ring 30, which is constructed of separate elements for purposes of assembly and disassembly, but which when assembled function as a single element, supports a drip ring 38 disposed in close proximity to the end of the cylindrical flange 31 so that during discharge the concrete flows over the drip ring into the receiving chute or discharge hopper 28 which surrounds the lower portion thereof. The drip ring which may be termed a directing element, being conical in shape and integral with bearing member 30 forms a good surface for the lower end of the hopper 29 to contact, for it steers the hopper into the center of the drum opening as the hopper is drawn into charging position.

The charging hopper illustrated in Figures 2 to 4 inclusive is supported entirely by external means so that there is no obstruction to the passage of materials through the hopper and into the drum. To this end the lower discharge port of the hopper is annular and corresponds in diameter to the diameter of the drum opening, a stiffening ring 39 being provided circumferentially of the discharge portion of the hopper, said ring being adapted upon tensioning of the hopper against the drum to press against the drip ring 38 as illustrated in Figure 5.

For supporting the hopper 29 there is a transverse pivot shaft 40 mounted in bearings 41 on the mixer frame 14 above the rear portion of the drum 11. The upper portion of the charging hopper is resiliently connected to the pivot shaft by means of a pair of depending arm structures 42, one arm structure being located on each side of the hopper, each arm structure being rigidly secured by weldments or otherwise to shaft 40 and having its free end hingedly connected to a plate 43 disposed in overlapping relation to a flange 44 extending from a bracket 45 secured to the upper side of the hopper. Some relative movement between the arm structure and the hopper brackets is desirable to accommodate for twisting movement of the frame 14 relative to the drum 11, and to accomplish this, slotted holes 46 are provided in flange 44 in alignment with apertures in plate 43 and the two elements are yieldably maintained together by bolts 47 freely extending through such apertures, said bolts having nuts 48 threaded on their lower ends, the nuts being spaced from the overlapping plates by coil springs 49 encircling the bolts. When the drum is loaded with aggregates, it tends to settle down, and this arrangement of springs and bolts permits the charging hopper 29 to move with the drum 11 due to compression of the springs 49 without straining the hopper supporting members or drawing the hopper out of seating engagement on the drum. Furthermore, since two such springs 49 are provided on each side of the hopper in parallel alignment with the drum axis, greater pressure may be exerted through the individual springs to cause the contacting faces of the hopper and the drum instrumentalities to assume parallel positions.

The hopper 29 is guided and the position of its lower portion is controlled by a second pair of arms 50 one on each side of the hopper, said arms also being rigidly secured to shaft 40 as in the case of the arm structures 42. The lower extremity of each actuating arm is pinned to an extensible link 51 which exerts pressure through a spring loaded arm 52 connected to a trunnion 53 mounted on the side of the hopper. The trunnions on each side of the hopper are roughly in line with an extension of the drum axis, when the hopper is in charging position, and a yoke 54 extends around the back of the hopper and connects the trunnions to relieve the metal of the hopper of the strain which the arms 50 exert upon it. With this construction it will be seen that the weight of the hopper is not supported by the arms 50, since the arms are not directly connected to the hopper, the weight of the hopper being supported entirely by the yieldable means such as springs 49 associated with the upper portion of the hopper.

The mechanism for moving the hopper rectilinearly from its charging position, as illustrated in Figure 1, to its discharging position may take different forms such as a hand wheel and worm gear, mounted in any suitable location, the worm wheel being keyed to the shaft 55 of a crank arm 56, the swinging end of which is pinned to a link 57 connecting it to one of the hopper actuating arms 50 at approximately the middle thereof. When it is desired to move the hopper into discharge position, the hand wheel is turned so as to swing the crank arm in a clockwise direction, thereby swinging arms 50 rearwardly of the mixer drum. Simultaneously, due to its rigid connection to arm 50, pivot shaft 40 is rotated, thereby moving the upper portion of the hopper away from the drum line 11 due to movement of arm structures 42, hinge plate 43 and the yieldable connecting means embodying the springs 49 previously described. With the hopper removed from the drum opening, concrete may be discharged into the receiving chute. During the charging operation however and preferably during the mixing operation, the hopper will be drawn into sealed tight engagement with the drum 11 and contact is made uniformly over the entire bearing surfaces due to the balanced application of pressure through the spring loaded arms 50 associated with the trunnions 53.

The discharge hopper or receiving chute 28 has a flanged portion 58 secured to the rear upright frame members, and as illustrated in Figures 5 and 8 has an inner edge forming a half circle around the underside of the drip ring 38. This hopper instead of being disposed symmetrically with respect to the drum axis is offset as illustrated in Figure 8. We have observed that when the drum is rotated in the direction shown by the arrow on Figure 8 to produce discharge, there is an excess of concrete discharged through the right side of the drum opening and to compensate for this, the center of the chute indicated by line A—A of Figure 8 is disposed substantially to the right of the drum axis (indicated by line B—B), or the side of the drum opening which is rising when the drum is rotating in the discharge direction, and as the major portion of the concrete leaves the ends of the spiral blades when they are approaching horizontal position, the concrete drops nearly vertically into the discharge hopper instead of being choked by the adjacent side of the hopper as in previous constructions.

This arrangement of drip ring, seals and receiving chute has another advantage in that it prevents concrete from dripping down the drum and onto the frame and bearings which support the rear part of the drum, thereby enabling the drum and frame to be kept clean and protecting the bearings in the drum rollers 17.

When the charging hopper is in discharge position, there is enough friction between the sealing bands 34 and the seal-retaining bearing member 30 to cause the latter to rotate with the drum 11 and such rotation will continue during initial, light contact between the hopper 29 and the drip ring 38 which is associated with member 30. This relative rotation will clear the drip ring of accumulation of concrete and permit accurate, tight sealing of the charging hopper. As more pressure is applied through the hopper supporting and actuating linkage, it is permissible for the ring 30 to either rotate with the drum 11 or be held stationary by the hopper 29, depending on whether friction is greater at the bearing surface 37 contacting the radial drum flange 32 or the surface of the drip ring 38 contacting the hopper. To insure that the member will not rotate with the drum there is provided delayed action means positively locking member 30 against rotation with the charging hopper 29.

Referring again to Figure 2, and also Figures 3 and 4, there is provided as part of rotatable member 30 a rim portion 59 constituting an annular track on its outer periphery. An abutment or lug 60 is mounted on this track providing a face 61 which may be engaged by an arm 62 welded or otherwise secured to sleeve 63 journalled on shaft 40. Sleeve 63 which is held against longitudinal movement with respect to shaft 40 by the disposition at one end of a collar 64 secured to the shaft and at the other end by one of the arm structures 42, is itself actuated by an arm 65 pinned to a link 66 the other end of which is pinned to the free end of crank arm 56 which moves the hopper. The length of link 66 may be adjusted through compression spring 67 which is tensioned by nut 68 so that the movement of arm 65 can be accurately controlled.

The linkage described in the preceding paragraph embodying the link 66, sleeve 63 and locking arm 62, enables the movement of locking arm 62 into locking position with lug 60 to be delayed until link 57 connecting the crank arm 56 to the arm 50 has been drawn over center during the movement of the charging hopper into charging position. In the meantime, sufficient contact has been made between the charging hopper and drip ring 38, which at this time is still rotating with the drum, to insure that the abutting surfaces of the drip ring and hopper are wiped clean of concrete accumulations. The final movement of the hand wheel pulls the arm 62 into position where it will engage the face 61 of lug 60 and when these faces contact, rotation of the ring 30 and its associated parts is positively prevented.

As heretofore mentioned the rear portion of the drum carries a track 16 which is adapted to rotate on supporting rollers 17. Since the drum is mounted for rotation about an inclined axis, the rollers 17 exert axial as well as radial thrust on the track 16 and to overcome the tendency of the track to break loose from the drum at the points where it is connected thereto, the track is spaced outwardly from the wall of the drum and the medial portion of the track is supported on the drum by means of a relatively thin web 69 of sufficiently narrow width that the web may flex or yield under variations in pressure on the track. Preferably the web 69 is welded to the exterior of the drum shell 11 and also to the annular track 16, care being exercised that the weld metal does not sufficiently thicken the web so as to destroy its yieldability as previously described.

In Figures 6 and 7, certain features of the invention are illustrated in a slightly modified form in conjunction with a somewhat different type of mounting for the charging hopper. In Figures 6 and 7, wherein like numerals will be used to designate parts which are the same as those illustrated in the other figures, the drum 11 carries an axially disposed tubular member 70 which serves as a bearing or sleeve for a shaft 71 rigidly connected to the hopper as by a bracket 72. Tube 70 may be mounted within the drum by means of radially extended rods 73 which are rigidly secured to portions of the mixing blades 26 mounted on the inside of the drum shell. With the apparatus shown, shaft 71 is rigidly attached to bracket 72, and since the hopper is non-rotatable, the sleeve 70 acts as a bearing due to the rotation of the drum. In order to discharge the mixer, the hopper is moved to the right, as viewed in Figure 6, thus sliding shaft 71 axially of its journal in sleeve 70, thereby providing space around the drum opening for discharge of concrete into the receiving chute 28.

The particular method of mounting the sleeve 70 is claimed in previously mentioned copending application of Louis G. Hilkemeier, Serial Number 515,834, now Patent No. 2,439,250, dated April 6, 1948, and the mounting of the hopper through means such as bracket 72 is claimed in copending application of Louis G. Hilkemeier, Serial Number 428,603, filed January 28, 1942, now Patent 2,362,435.

The apparatus for actuating the hopper 29 from its charging position to its discharged position and vice versa is substantially the same as that described in conjunction with the other embodiment of the invention; i. e. depending arms 50 being pivotable about the axis of a transverse pivot shaft 40 and actuated by a link 57 as previously described. The lower extremities of the arms are pinned to links 51 which house the spring loaded arms 52 connected to the trunnions 53 extending from the sides of the hopper. In this instance, the trunnions are braced by bracket members 74 extending rearwardly from the annular stiffening ring or collar 39 which surrounds the periphery of the discharge opening of the hopper.

The upper portion of the hopper is also linked to pivot shaft 40 as by the parallel linkage 75 so as to permit rectilinear movement of the hopper but prevent rotation thereof. Links 75 do not carry the weight of the hopper as do the plates 43 and depending arms 42 of the structure shown in Figure 2, the weight of the hopper in the present embodiment being carried by the drum 11 through the shaft 71 and the bearing.

Bracket 72 which is best illustrated in Figure 7, is rigidly secured as by bolts 76 to the inner side of the upper portion of collar 39 and said bracket extends substantially radially of the axis of the discharge opening where it is rigidly secured to shaft 71. The bracket 72 is apertured as at 77 to provide ports for the escape of air during the charging operation, said ports communicating with the space provided by a shield 78 mounted a short distance rearwardly of the upper front wall 79 of the hopper 29 to which the links 75 are connected. In Figure 7, the shield is shown in dotted lines since it is ahead of the section line on which this view is taken.

The shield is hinged on brackets 80 and being non-rigidly mounted, it may vibrate during the operation of the mixer to thereby loosen material which might happen to come between it and the front wall 79 of the hopper. This vibratory action keeps the passageway clean for the escape of air during charging. The same bearing ring and seal 30 may be employed in each construction and therefore the cross section through the member which is illustrated in Figure 5 is equally applicable to both forms of the invention.

For locking the ring 30 against rotation after the hopper 29 has sufficiently engaged it and cleaned the conical seating surface of drip ring 38, the same linkage may also be employed as has been described in conjunction with the hopper of Figure 2. That is to say, a depending stop or abutment 62 journalled on shaft 40 may be caused to engage a lug 60 mounted on rim portion 59 of ring 30, so as to lock the ring against rotation at the proper time, the movement of stop 62 being controlled through independent linkage and in the manner previously described.

While in the embodiments illustrated, the ring assembly 30 is shown united with the mixer drum 11, it is appreciated that it could be supported by the hopper 29. Whether mounted on one or the other of these elements, the annular member will be rotatable with respect to the element on which it is mounted, and will have a bearing surface for engagement therewith to be rotatable relative to the drum, as long as the charging element, namely, the hopper, is in a position removed from the drum.

Having now particularly described and ascertained the nature of our said invention and in what manner the same is to be performed, we declare that what we claim is:

1. In a concrete mixer, a rotatable mixing drum having an axial opening at one end through which materials pass to and from the drum, an annular member journalled on the end of the drum adjacent said opening, said member being disposed to encircle the drum opening and prevent leakage of material between it and the drum, a charging hopper movable to and from the drum opening having a portion making contact with said annular member when the hopper is in charging position, an element movable toward and from said member disposed to prevent rotation of said member when engaged therewith, means for moving said element into engagement with said member in response to movement of said hopper into charging position and including delayed action means connecting said hopper and said element to cause said element to engage said member and prevent rotation thereof with respect to said hopper only after rotational contact has occurred between the hopper and the annular member to clean their abutting surfaces.

2. In a concrete mixer, a rotatable mixing drum having an axial opening at one end for receiving and discharging materials, a sealing ring journalled on said drum adjacent said opening, said ring being free to rotate with said drum except when locked against rotation, a charging hopper movably mounted adjacent said drum opening and arranged when in charging position to contact said ring to register with said opening, locking means arranged to prevent rotation of said ring when moved into a predetermined position, and means responsive to movement of said hopper to cause movement of said locking means into locking position, the action of said locking means being delayed to permit frictional contact between the hopper and the rotating ring to clean their abutting surfaces.

3. In a concrete mixer having a rotatable mixing drum with an axial opening at one end for discharging and charging materials, said drum having integral therewith an annular element surrounding said opening, a charging element having an annular lower portion and movable from a charging position adjacent said opening to a discharging position removed therefrom, said charging element being held against rotation in either position, an intermediate ring member journalled on one of the said elements arranged to make sealing contact with the other when the charging element is in charging position, releasable means locking said ring against rotation with respect to one of said elements, and means releasing said locking means prior to contact disengagement of the ring from the element it seals, whereby the ring may rotate with respect to said last mentioned element and due to contact therewith may clean their abutting surfaces of concrete that may be lodged thereon.

4. In a concrete mixer having a rotatable mixing drum with an axial opening at one end for charging and discharging materials, said drum having thereon an annular element surrounding said opening, a charging element of funnel-like shape having an annular discharge port, means mounting said charging element for rectilinear movement to and from the drum opening, a ring journalled on one of said elements disposed to make bearing contact against the other element when the charging element is in charging position, means retaining said ring on the element it journals, and means allowing relative rotation between said ring and the element against which it bears after contact has occurred to wipe material from their contacting surfaces, and thereafter in response to movement of the charging element relative to the drum positively stopping such rotation.

5. Charging instrumentalities for a rotatable mixer drum of the type having an axial opening through which material is charged and discharged, said instrumentalities comprising an annular member journalled on the drum in a position surrounding said opening and adapted to be pressed into bearing contact with the drum, a charging hopper movable to and from a position enclosing said annular member, a pivot shaft, means associated with said shaft for actuating said hopper, and means pivotally mounted on said shaft movable in response to movement of said hopper actuating means for locking said annular member against rotation after initial relative rotation has occurred between the hopper and said member in contact with each other.

6. In a mixing machine of the character described, comprising a rotatable mixing drum having an axial opening at one end and spirally arranged blades secured to the inner walls of said drum adapted upon rotation of the drum in one direction to effect discharge of materials through the opening, a charging hopper movable to and from said opening, a discharge chute for receiving material propelled through said opening by the aforesaid mixing blades when said charging hopper is removed from the drum opening, said chute having its center offset with respect to the vertical plane running through the drum axis and disposed between said axis and the side of the drum opening which is rising during rotation as aforesaid, whereby materials elevated by said mixing blades to the discharge opening may fall substantially vertically into said discharge chute and substantially centrally thereof.

7. In a concrete mixer of the character described, a mixing drum having an opening at one end for receiving materials, an axially disposed supporting member mounted in said drum, a charging hopper supported by said member and movable axially with respect thereto, means external to the drum for moving the hopper axially with respect to said opening and for preventing rotation thereof, an annular member journalled on the drum adjacent said opening disposed to seal the space between the hopper and the drum when the hopper is in charging position, said annular member normally rotating with said drum unless restrained, and means responsive to movement of the hopper for restraining rotation of said annular member after rotational contact between said hopper and said annular member has occurred.

8. In a concrete mixer having a rotatable mixing drum with an axial opening at one end for discharging and charging materials, said drum having integral therewith an annular element surrounding said opening, a charging element having an annular lower portion and movable from a charging position adjacent said opening to a discharging position removed therefrom, said charging element being held against rotation in either position, an intermediate ring member journalled on one of said elements arranged to make sealing contact with the other when the charging element is in charging position, releasable means locking said ring against rotation with respect to the element with which it makes sealing contact, and means actuating said locking means after contact engagement of the ring with the element it seals, whereby the ring may rotate with respect to said last mentioned element while in contact therewith.

9. In a mixing machine having a frame and a rotatable mixing drum mounted thereby which is provided with a material transfer opening at one end: means for charging materials into the drum comprising a hopper having an annular lower portion arranged to register with said opening when the hopper is in charging position; a pivot shaft on the frame disposed transversely of the mixing drum, a pair of depending arms movable about the axis of said shaft, means connecting said arms with opposite sides of said hopper at points approximately in line with an extension of the drum axis when the hopper is in charging position, and mechanism connecting the upper portion of the hopper and the frame including a member compressible in a substantially vertical direction permitting limited vertical movement of the hopper relative to the drum.

10. Apparatus according to claim 9 in which the compressible member supporting the hopper is itself supported by means suspended from the transverse pivot shaft, and in which said last mentioned means is also pivotal about the axis of said shaft.

LOUIS G. HILKEMEIER.
GEORGE K. VIALL.

REFERENCES CITED

The following references are of record in the file of this patent:

UNITED STATES PATENTS

| Number | Name | Date |
|---|---|---|
| 410,292 | Ransome | Sept. 3, 1889 |
| 1,103,534 | Nye | July 14, 1914 |
| 2,265,751 | Ball | Dec. 9, 1941 |
| 2,265,752 | Ball | Dec. 9, 1941 |
| 2,280,513 | Jaeger et al. | Apr. 21, 1942 |
| 2,281,820 | Ball | May 5, 1942 |
| 2,285,685 | Schafer | June 9, 1942 |
| 2,316,137 | Visser | Apr. 6, 1943 |
| 2,329,167 | Viall et al. | Sept. 7, 1943 |
| 2,360,345 | Hilkemeier | Oct. 17, 1944 |